United States Patent [19]

Gardner

[11] Patent Number: 5,108,208

[45] Date of Patent: Apr. 28, 1992

[54] ALLOCATION OF MEMORY IN A FONT CARTRIDGE

[76] Inventor: Michael E. Gardner, 621 W. Garland Ter., Sunnyvale, Calif. 94086

[21] Appl. No.: 504,693

[22] Filed: Apr. 4, 1990

Related U.S. Application Data

[63] Continuation of Ser. No. 280,030, Dec. 5, 1988, abandoned.

[51] Int. Cl.⁵ .............................................. B41J 5/30
[52] U.S. Cl. ................................. 400/121; 395/110; 340/735
[58] Field of Search ............. 400/61, 70, 76, 121; 340/735, 790; 395/110, 112, 150, 164, 165

[56] References Cited

U.S. PATENT DOCUMENTS

| | | | |
|---|---|---|---|
| 4,180,855 | 12/1979 | Buedel | 364/200 |
| 4,181,933 | 1/1980 | Benysek | 364/200 |
| 4,353,653 | 10/1982 | Zimmerman | 400/20 |
| 4,365,292 | 12/1982 | Barnes | 364/200 |
| 4,368,515 | 1/1983 | Nielsen | 364/200 |
| 4,426,166 | 1/1984 | Bowling | 400/62 |
| 4,485,457 | 11/1984 | Balaska | 364/900 |
| 4,763,281 | 8/1988 | Arakawa | 400/61 |

FOREIGN PATENT DOCUMENTS 177255  8/1986  Japan ................................. 400/121

Primary Examiner—David A. Wiecking
Assistant Examiner—Steven S. Kelley
Attorney, Agent, or Firm—Thomas E. Schatzel

[57] ABSTRACT

A font cartridge has a memory which stores font information for a number of different fonts. The number of different fonts or the total memory size may exceed the maximum memory size or number of fonts which may be accessed by a printer at any one time. A switching function, a switch configuration logic, and a controller, allow a user to access different combinations of font data to the printer such that the total number of font data and memory size available to the printer does not exceed its limit at any one time.

10 Claims, 2 Drawing Sheets

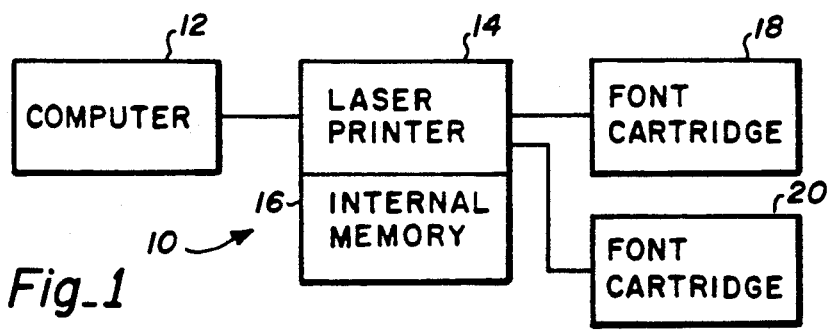
Fig_1
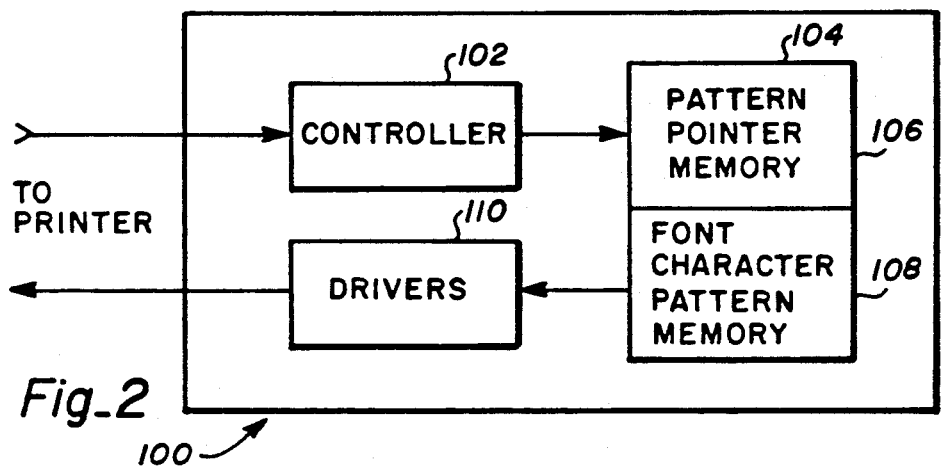
Fig_2
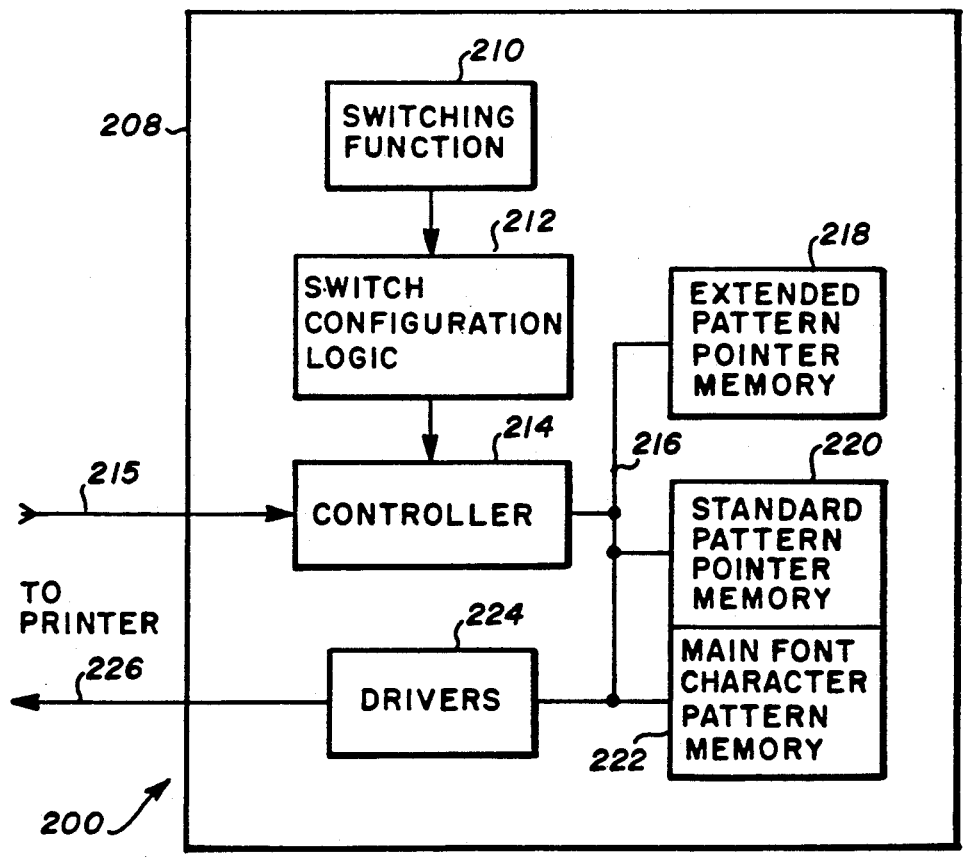
Fig_3

ALLOCATION OF MEMORY IN A FONT CARTRIDGE

This is a continuation of copending application Ser. No. 07/280,030 filed on Dec. 5, 1988, now abandoned.

BACKGROUND OF THE INVENTION

1. Field of the Invention

The invention relates generally to electrical font cartridges and more particularly to electrical font cartridges for use in printers.

2. Description of the Prior Art

Laser printers and ink jet printers have become increasingly popular. These printers, which provide a high quality printed product, are often used in connection with personal computers to provide desk top publishing capability. Hewlett Packard Company (HP) sells a line of such laser printers under the trademark "LaserJet".

These printers do not have a mechanical impact head. Instead, in the case of the laser printers, printed characters are formed by the interaction of a laser beam and the black powder "toner" that makes the actual images. Many different types of fonts may be specified to the printer. The different fonts are designated by a font selection parameter which consists of several fields of characters. Typically, a laser printer has an internal memory which stores two or more of the most common font styles. The printers also have at least one slot for receiving a font cartridge. The font cartridges have memories which contain additional fonts.

HP sells a number of font cartridges, labelled A-Z for its line of laser printers. Each cartridge typically contains between three and eighteen fonts. Some of the newer laser printers also have multiple slots for receiving a number of font cartridges at the same time in order to provide the printer with a greater number of fonts from which to select.

In operation, the printer reads the font information in the font cartridges into its own internal memory for use during printing. The printers are limited in the number of fonts and the amount of cartridge memory which they may access at any one time because of the limits of the printer internal memory and control. For example, one popular model of the HP LaserJet printer has two cartridge slots, but it can recognize a maximum of only one hundred thirty six different fonts between the two cartridges and the maximum memory per cartridge is limited by the printer's memory address capacity to two megabytes. If either the number of different fonts or the total memory inside the two cartridges exceeds this limit, then the printer will not function properly. Due to the large number of different types of fonts, additional cartridges must be made available and substituted into the printer's cartridge slots as necessary. This constant changing of cartridges is very time consuming and requires the user to maintain a library of different cartridges.

SUMMARY OF THE PRESENT INVENTION

It is an object of the present invention to provide a font cartridge with an increased number of fonts which can be recognized by a printer.

It is another object of the present invention to provide a font cartridge which can be set by the user or the manufacturer to provide different combinations of fonts to a printer.

Briefly, in a preferred embodiment, the present invention comprises a font cartridge having a controller which is connected to a standard pattern pointer memory and an extended pattern pointer memory. A main font character pattern memory is connected to both of the pointer memories. Note that there is no requirement that the pattern and pointer memories be physically separate entities. They are illustrated that way here for ease of explanation. The output of the main font character pattern memory is connected to drivers which in turn are connected to a printer. A switching function is connected to a switch configuration logic which is connected in turn to the controller.

In operation, the main font character pattern memory contains digital information which instructs the printer how to form the different font characters. Many of the same font characters can be used in several different fonts. The extended pattern pointer memory and the standard pattern pointer memory each contain a plurality of font data. Such font data contains a font parameter and its associated mapping information which indicates the specific location of characters in the main font character pattern memory which are associated with that font. The extended pointer memory may also contain some number of font character patterns separate from the main font character pattern memory. These extra patterns can be used to supplement or to correct possible errors or omissions in the main font character pattern memory. Setting the switches causes the configuration logic to instruct the controller to allow the printer to access only a certain number of font data in the pointer memories at one time. This number represents a fraction of the total number of font data in the pointer memories. The cartridge of the present invention can thereby provide the printer with a larger number of fonts than was previously allowed.

An advantage of the present invention is that it provides a font cartridge with an increased number of fonts and size of memory which can be recognized by the printer.

Another advantage of the present invention is that it provides a font cartridge which can be set by the user or the manufacturer to provide different sets of fonts to a printer.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 shows a block diagram of a prior art printer system;

FIG. 2 shows a block diagram of a prior art font cartridge;

FIG. 3 shows a block diagram of the font cartridge of the present invention.

DETAILED DESCRIPTION OF THE PREFERRED EMBODIMENT

Figure 4:
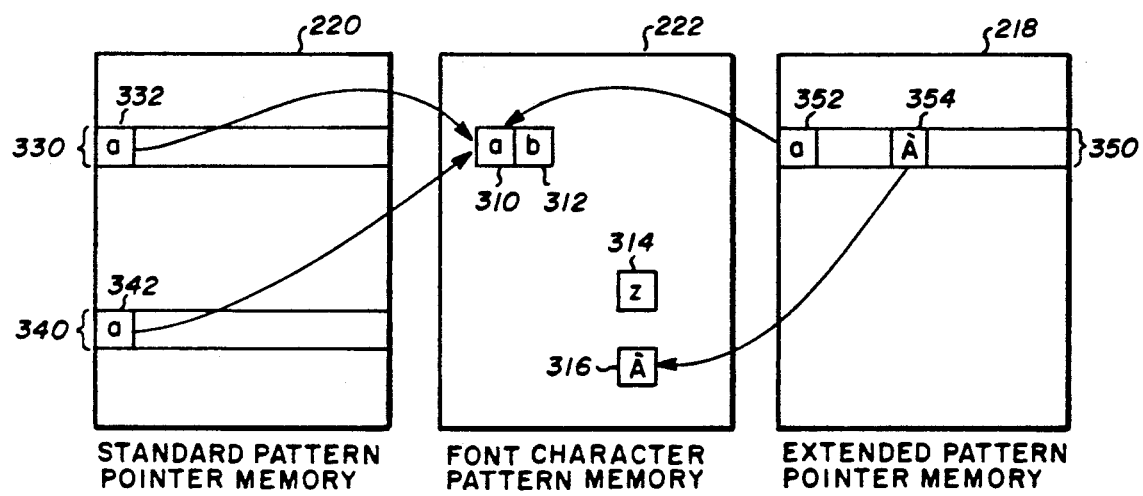
FIG. 4 shows a block diagram of the memory of the cartridge of FIG. 3.

FIG. 1 is a block diagram of a printer system of the prior art and designated by the general reference number 10. System 10 comprises a computer 12 or computer system which is connected to a laser printer 14. Laser printer 14 may be a LaserJet printer made by Hewlett Packard Company. An ink jet printer may be used in place of laser printer 14. Printer 14 has an internal memory 16 which contains one or more fonts in permanent memory and may contain additional fonts loaded from computer 12 into a changeable memory. These fonts loaded from the computer 12 are sometimes referred to as down-loadable fonts.

A pair of font cartridges 18 and 20 are connected to printer 14 by inserting them into slots provided in printer 14. Font cartridges 18 and 20 have memories which store additional fonts. Printer 14 may provide for one or more cartridge slots, although two are illustrated here.

In operation, computer 12 sends printer 14 a message that it wants to print some text. The computer 12 provides to the printer 14 a font selection parameter which specifies the particular font it wants to use. Printer 14 then searches its internal memory 16 and accesses the font cartridges 18 and 20 in order to find a matching font selection parameter. When a match is found, then the font data associated with that font selection parameter is used by the printer 14 to print the text.

FIG. 2 shows a block diagram of a prior art font cartridge and is designated by the general reference number 100. Cartridge 100 comprises a controller 102 which is connected to a printer. Controller 102 is connected to a memory 104 which is comprised of a pattern pointer memory 106 and a font character pattern memory 108. Memory 106 contains font data which is comprised of a font parameter and its matching mapping data and memory 108 contains font character data (i.e., information which tells the printer how to form the shapes of each character). Memory 104 is connected to drivers 110 which in turn are connected to the printer.

In operation, the printer sends a control signal to cartridge 100. The controller 102, responsive to the control signal, causes memory 104 to send font data and font character data to the printer via drivers 110. The printer stores the data in its memory for use. However, the printer memory and control is limited and will recognize only a certain number of font parameters and their matching mapping data at one time. For example, one popular model of the HP LaserJet printer can recognize a maximum of one hundred thirty-six different fonts and has only sufficient address capacity to access a total cartridge memory size of two megabytes. If cartridge 100 contains more memory than this, then the printer will not function properly. Also, if the total number of different fonts in all cartridges exceeds one hundred thirty-six, then the printer will not function properly.

FIG. 3 shows a block diagram of a font cartridge of the present invention and is designated by the general reference number 200. Cartridge 200 is comprised of a cartridge housing 208 which is shaped to fit into a cartridge slot of a printer. A switching function or plurality of switches 210 are mounted in cartridge housing 208 and may be made accessible to the user from outside the cartridge housing 208. Switching functions 210 may also be traces or wiring lines which are set by the manufacturer. The switches 210 are connected to a switch configuration logic 212. Configuration logic 212 may be one or more logic array chips or gate array chips or may physically be a shared portion of other chips such as controller 214.

Switch configuration logic 212 is connected to a controller 214. Controller 214 may be one or more logic array chips or gate array chips or may be a shared portion of logic 212. The input to controller 214 is connected to a printer by means of input lines 215. The output of controller 214 is connected to a bus 216. Bus 216 is connected to an extended pattern pointer memory 218, a standard pattern pointer memory 220, a main font character pattern memory 222 and drivers 224. Drivers 224 are connected to the printer by output lines 226.

Memories 218, 220 and 222 may be ROM chips. FIG. 3 shows memory 218 as a separate ROM chip and memories 220 and 222 as a single ROM chip. However, the memories 218, 220 and 222 may be constructed on a single ROM or a combination of ROM chips in various configurations. Drivers 224 may be 74LS244 type drivers.

FIG. 4 shows a block diagram of the memories 218, 220 and 222 of FIG. 3. The main font character pattern memory 222 contains the digital information which tells the printer how to form each of the various characters. For example, a section 310 of memory 222 is devoted to information on how to form the character "a". Similarly, a section 312 stores information on character "b", a section 314 stores information on character "z" and a section 316 stores information on character "À".

The standard pattern pointer memory 220 stores a plurality of font data. Each font data comprises a font selection parameter and its associated mapping information for each character in that particular font. The font selection parameter uniquely identifies the particular font. Fonts can differ in the type of the type face of the character, the boldness of the character and the height of the characters among other characteristics. However, many of the fonts share some of the same characters. In fact, some fonts may be merely subsets of characters of other fonts. Thus, each font is a unique combination of some of the characters stored in the main font character pattern memory 222.

The standard pattern pointer memory 220 is divided into sections, each of which stores the font parameter and mapping information for a standard (i.e., commonly used) font. For example, section 330 contains information on the USASCII font. A portion 332 of section 330 contains mapping information for the character "a" which tells the printer that character "a" may be found in section 310 of memory 222. A section 340 of memory 220 contains information on the Roman-8 font. A portion 342 of section 340 contains mapping information which also tells the printer that character "a" may be found in section 310 of memory 222. It can be seen that both the USASCII and Roman-8 fonts share the same character "a".

The extended pattern pointer memory 218 is also divided into sections similar to those of memory 220. Memory 218 may store information for relatively unusual fonts which are used less often. For example, a section 350 has information for a French-Canadian font. A portion 352 contains mapping information to section 310 of memory 222. A section 354 contains mapping information for the character "À" which directs the printer to look at section 316 of memory 222 for information. Less known characters such as "À" are shared with fewer fonts than common characters such as "a".

As stated above, there is no requirement that the pattern and pointer memories be physically separate entities. Extended pattern pointer memory 218 may also contain some number of font character patterns similar to those of sections 310, 312, 314 and 316 of memory 222. The operation and use of these patterns in memory 218 is the same as those of memory 222 except they are part of memory 218.

Turning now to FIG. 3, the operation of the present invention is understood to be as follows. The printer sends a control signal along lines 215 to controller 214. The controller 214 causes the data in the font character pattern memory 222 and a certain number of the font data in either the extended pattern pointer memory 218 or the standard pattern pointer memory 220 to be sent to the printer via drivers 224 and output lines 226. The amount of font data sent to the printer is such that it does not exceed the printer limit. As stated above, the printer memory and control is limited and will address only a certain limited cartridge memory size or accept a cartridge containing a certain number of fonts and their associated font mapping information at one time.

The particular combination of font data which is sent to the printer is determined by the user or the manufacturer by setting the switching function or switches 210 on the outside of cartridge 200. The settings of the switches 210 is read by the configuration logic 212. A configuration signal is sent to controller 214 by logic 212 responsive to the switch settings. This configuration signal contains information which tells controller 214 which combination of font data to send to the printer. The total combination of font data sent to the printer does not exceed the limit of the printer memory and control.

Cartridge 200 may have only a single switch 210 which causes controller 214 merely to shift between accessing only the extended pattern pointer memory 218 or the standard pattern pointer memory 220. In such a case, the combination of memories 218 and 222 or 220 and 222 would each contain a maximum of two megabytes of total memory storage. Two megabytes represents the maximum cartridge memory address capacity of one popular model of the HP LaserJet printer. In addition, the total number of fonts contained in either the combinations of memories 218 and 222 or memories 220 and 222 may not exceed the printer limit. The maximum number of fonts is one hundred thirty-six shared between two cartridges in the case of one popular model of the HP LaserJet printer.

Cartridge 200 may also have a plurality of switches 210. Memories 218 and 220 may then contain a larger number of fonts. Controller 214 would then be instructed to access only a portion of either memory 218 or 220. Additionally, depending upon how the switches are set, controller 214 may be instructed to access a combination of fonts from memories 218 and 220, the number of which does not exceed the maximum allowed by the printer.

The advantages of the present invention may now be understood. The present invention provides a font cartridge which can provide a much greater number of fonts than were previously possible on a single cartridge. This single cartridge can now contain almost all of the fonts which are required for use. The present invention eliminates the need for a large library of font cartridges. Instead, the user of the present invention can select the appropriate combination of fonts needed by merely setting switches on a single cartridge.

Additionally, the manufacturer can also easily make changes in the font cartridge. The switching function 210 may be traces or wires which the manufacturer connects in a certain way to select an appropriate combination of fonts. Thus, one cartridge may be produced by the manufacturer and custom configured to a particular customers needs. A cartridge having a few defective fonts could be reconfigured to provide the customer with only the working fonts.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A font storage device with interfacing for a printer and for storing font data signal information representing a plurality of fonts, each font having a plurality of constituent characters, the device comprising:

main font character pattern memory means for storing font data digital information representing unique characters from each of said fonts such that redundancies are reduced in said stored characters; and standard pattern pointer memory means for storing pointers to font data digital information representative of all the individual characters in the main font character pattern memory means, said pointers being arranged into sections, each of said sections of pointers respectively representing all of the characters in each of the fonts.

2. The device of claim 1, further comprising:

extended pattern pointer memory means for storing pointers to font data digital information representative of individual characters in the main font pattern memory means, said pointers being arranged into sections, said sections respectively representing each of the fonts.

3. The device of claim 2, further comprising:

input lines for receiving a control signal from the printer;

output lines for signals to the printer; and controller means for sending data in the main font character pattern memory means, the standard pattern pointer memory means, and the extended pattern pointer memory means to the output lines in response to said control signal on said input lines.

4. The device of claim 3, wherein:

the controller means is connected to a switching means for multiplexing font addressing such that a capability of the printer to access font data is extended beyond the address space directly addressable by the printer.

5. The device of claim 4, wherein:

said switching means and controller means are functionally in front of said standard pattern pointer memory means and said extended pattern pointer memory means; and said standard pattern pointer memory means and said extended pattern pointer memory means are switchable such that the amount of available address space in the device is not dependent on the number of address bits available from an interface to a printer.

6. The device of claim 5, wherein:

said standard pattern pointer memory means and said extended pattern pointer memory means each point to separate areas of the main font character pattern memory.

7. The device of claim 5, wherein:

said standard pattern pointer memory means and said extended pattern pointer memory means each point to overlapping areas of the main font character pattern memory.

8. The device of claim 5, wherein:

said pointers in either said standard pattern pointer memory or said extended pattern pointer memory are functionally routed through said switching and said controller means so that the address space of said main font character pattern memory means can be expanded beyond a limitation of the number of address lines available from said interface to a printer.

9. A method of compressing several fonts in a limited size memory, the method comprising the steps of:

storing characters from a plurality of fonts in a first section of memory such that redundancies between said stored characters are eliminated;

storing pointers arranged in groups in a second section of memory, said stored pointers pointing to said characters in said first section of memory, each of said groups corresponding to all of the characters of a single font of said plurality of fonts; and reading characters according to their respective membership in a font by accessing at least one of said pointers to determine which of said characters in said first section of memory should be read and then by accessing such characters.

10. The method of claim 9, further comprising the step of:

dividing said first section of memory into parts and enabling one of said parts with a switching and controller means according to which particular pointer has been accessed last.

* * * * *